United States Patent
Pliassounov

(10) Patent No.: US 6,527,304 B1
(45) Date of Patent: Mar. 4, 2003

(54) BRAKE TUBE CONNECTOR

(75) Inventor: Stanislav Ivanovitch Pliassounov, Oakville (CA)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/505,973

(22) Filed: Feb. 17, 2000

(51) Int. Cl.⁷ .............................. F16L 25/00; F16L 35/00
(52) U.S. Cl. .................... 285/334.5; 285/233; 285/234; 285/332; 285/332.1; 285/335; 285/342; 285/353; 285/354
(58) Field of Search ................. 285/334.5, 332, 285/335, 354, 332.1, 342, 353, 233, 234

(56) References Cited

U.S. PATENT DOCUMENTS

| | | | | |
|---|---|---|---|---|
| 1,839,909 A | * | 1/1932 | Weatherhead, Jr. | 29/890.14 |
| 1,894,700 A | * | 1/1933 | Parker | 285/332.1 |
| 2,427,260 A | * | 9/1947 | Cowles | 285/334.5 |
| 2,463,336 A | * | 3/1949 | Weatherhead | 285/234 |
| 2,490,620 A | | 12/1949 | Cole et al. | 285/122 |
| 2,534,198 A | * | 12/1950 | Guarnaschelli | 285/383 |
| 2,536,354 A | | 1/1951 | Cowles | 285/86 |
| 2,549,741 A | | 4/1951 | Young | 285/86 |
| 3,092,404 A | * | 6/1963 | MacWilliam | 285/334.5 |
| 3,346,274 A | * | 10/1967 | Baron | 285/52 |
| 3,837,687 A | * | 9/1974 | Leonard | 285/111 |
| 3,973,792 A | * | 8/1976 | Gönner | 285/341 |
| 4,492,488 A | * | 1/1985 | Warshawsky | 403/113 |
| 4,735,442 A | * | 4/1988 | Bürli | 285/175 |
| 4,778,203 A | | 10/1988 | Bartholomew | 285/111 |
| 5,074,599 A | * | 12/1991 | Wirbel et al. | 285/93 |
| 5,380,019 A | * | 1/1995 | Hillery et al. | 277/236 |
| 5,529,349 A | * | 6/1996 | Gibbs et al. | 285/332 |
| 5,586,792 A | * | 12/1996 | Kalahasthy et al. | 285/319 |
| 5,735,553 A | | 4/1998 | Niemiec | 285/101 |
| 5,887,912 A | * | 3/1999 | Nakamura | 285/334.5 |
| 5,893,591 A | * | 4/1999 | Ebel et al. | 285/354 |
| 5,961,160 A | * | 10/1999 | Fröhlich | 285/342 |
| 6,168,211 B1 | * | 1/2000 | Schorn-Gilson | 285/348 |
| 6,042,154 A | * | 3/2000 | Gensert et al. | 285/233 |

FOREIGN PATENT DOCUMENTS

| | | | | |
|---|---|---|---|---|
| DE | 2817438 A1 | * | 11/1979 | 285/334.5 |
| DE | 2820337 A1 | * | 11/1979 | 285/334.5 |
| DE | 3105395 | | 11/1982 | |
| DE | 4236323 | | 5/1994 | |

OTHER PUBLICATIONS

Joseph Edward Shigley, *Mechanical Engineering Design*, Third Edition, McGraw–Hill Book Company, pp 310–311, 1963.

* cited by examiner

Primary Examiner—Robert J. Sandy
Assistant Examiner—Carlos Lugo
(74) Attorney, Agent, or Firm—Gregory B. Brown

(57) ABSTRACT

A connector (10) for sealing an elongated tube (14) to a body (22) comprises a nut (12) concentrically about the tube (14) proximate the flared end (16). The nut (12) has a threaded exterior portion (34) and an abutting face (42) proximate to and concentric with the exterior face (32) of the flared end (16). A non-linear spring (44) between the exterior face (32) of the flared end (16) and the abutting face (42) of the nut (12), and is displaced upon tightening of the nut (12) to the body (22) to generate a substantially constant restorative force over a portion of the displacement to urge the interior face (30) of the flared end (16) into sealing engagement with and against the shoulder (38) of the body (22).

15 Claims, 2 Drawing Sheets

BRAKE TUBE CONNECTOR

FIELD OF THE INVENTION

This invention relates to a high pressure fitting for a closed hydraulic fluid system of the type used in a motor vehicle to actuate the braking system. More particularly, the present invention relates to a threaded connector for a braking system that maintains a fluid-tight seal if the threaded connector becomes loose after assembly and in operation.

DESCRIPTION OF THE RELATED ART

High pressure hydraulic fluid systems are commonly used in motor vehicle braking systems. A supply of hydraulic braking fluid is maintained in a master cylinder and, upon actuation of the brake pedal, supplied at elevated pressure (i.e., 2000 psi) to individual wheel cylinders. The wheel cylinders, in turn, urge friction surfaces into contact to generate a braking force. Thus, several component interfaces exist in motor vehicle braking systems that must maintain a relatively high brake fluid hydraulic pressure throughout the service life of the braking system. In light of the importance of motor vehicle braking systems, any leakage of hydraulic brake fluid is unacceptable.

Threaded connectors are commonly used to attach brake tubing to the various braking system components in the manufacture of such braking systems. Such connectors typically include a nut having external threads situated over a flared tube end that is inserted into a mating threaded hole in the braking system component to which the tube is to be attached. An operator hand starts the nut into the hole, usually for two to three rotations. The nut is then secured by clockwise rotation of an air gun, which stops automatically when the proper torque has reached. When the gun stops, the operator withdraws the gun away from the component, preferably without imparting any counterclockwise rotation to the nut. The operator then opens the gun's head and removes the gun.

The connector is sealed only if the clamping force generated by the interaction of the threads of the nut and hole is high enough to withstand the inner pressure, If the torque is too low, the clamping force will not compress the flared tube end sufficiently within the mating hole and the connector will leak. It has been found that even small counterclockwise rotation of the nut can dramatically reduce the clamping force and eventually compromise the seal. For example, if the nominal thread pitch is 1 mm, a one-quarter rotation obtains a 0.25 mm axial displacement. Since the tubing material is fairly compliant and is generally stressed beyond its yield strength during assembly, there is little residual elasticity in the system to accommodate even a relatively small 0.25 mm clearance appearing at the seal.

Thus, even slight counterclockwise nut rotation, such as that created accidentally by the operator from improper removal of the air gun after assembly, can be sufficient to compromise connector performance. This is particularly a problem arising from the time limitations for each line operation. In mass production vehicle assembly operations, operators typically perform 50 to 100 such fluid connection installations per hour. At such line speeds, the operator may be unaware of the inadequate connector torque condition or may be unable to correct the same if discovered. Thus, leaking caused by inadequate connector torque remains a chronic assembly line problem. Since very few leaks are caused by component damage, a solution of the problem of inadequate torque from improperly installed threaded tube connectors was sought to largely eliminate this assembly line problem.

One possible solution to the loss of clamping load due to counterclockwise rotation of the nut is to adopt a finer thread pitch to reduce the influence of counterclockwise rotation of the nut. A smaller thread pitch reduces the axial movement for a given amount of rotation. However, a finer thread pitch also tends to lower the thread strength and in turn lowers clamping load. Finer thread pitch also increases the possibility of cross-threading upon initial installation, the other major source of connector leakage.

Other solutions include the use a separate elastic element between the connector's components, such as the flare, nut and hole, to assist the threads in compressing the flared tube end sufficiently into the mating hole. To a certain extent, such elastic elements do compensate for the reduction in the thread-generated clamping force caused by movement of the components. Several kinds of elastomeric materials, such as plastic or rubber, can be disposed between the connector's elements to maintain a load on the connector. Likewise, coil springs can be provided about the brake tube for this purpose.

However, the main shortcoming of such solutions is that the load-deflection curve of such elastic elements is linear. Although linear elastic elements reduce the sensitivity to counterclockwise rotation and loss of clamping force, a linear elastic element will also suffer from a lower clamping force in proportion to the same displacement and to the same degree as that lost from the thread-generated clamping force at the same increment of rotation. Thus, the clamping force still depends on the relative position of the connector nut to the braking system component, since if counterclockwise revolution from a proper initial position occurs, the clamping force from the increasingly less displaced spring or elastic element will linearly drop until complete relaxation. For brake system tubing associated with high fluid pressure, the prior art failed to assure a desired clamping force within a realistic range of final connector torques and nut locations.

SUMMARY OF THE INVENTION

According to the present invention, a high pressure fitting for a closed hydraulic fluid system of the type used in a motor vehicle to actuate the braking system maintains a fluid-tight seal even if the threaded connector becomes loose after assembly and in operation. The connector sealingly mates an elongated tube to a component, where the tube has a flared, open end. The flared end forms an interior face and an exterior face and the component body has a recessed interior threaded hole axially aligned and in fluid communication with the flared open end of the tube. The threaded hole in the component body is countersunk to define a shoulder against which the interior face of the flared, open end of the tube is disposed.

The connector includes a nut concentrically disposed about the tube proximate the flared, open end of the tube. The nut has a threaded exterior portion and an abutting face proximate to and concentric with the exterior face of the flared, open end of the tube. A non-linear spring is disposed between the exterior face of the flared, open end of the tube and the abutting face of the nut. The non-linear spring is displaced upon tightening the nut to the body so as to generate a substantially constant restorative force over a portion of the displacement to urge the interior face of the flared, open end against the shoulder of the body. By careful selection of the non-linear spring's physical properties to obtain a desired load-deflection curve, the clamping force can be maintained practically constant if deflection occasioned by a lowering in the connector torque and relative displacement of the connector nut occurs.

In the preferred embodiment, a Belleville spring provides the elastic element. Being turned out of its flat state, as it is caused to form a cone in the other direction after compression, a Belleville spring provides a practically constant force over a relatively wide range of deflection. Due to its relatively constant or flat load-deflection curve within predetermined range, the use of a Belleville spring in a brake tube connector maintains the same clamping force within a broader range of connector torque and nut position. For example, it has been found sufficient to employ a non-linear spring that has a constant load over a 1 mm deflection to provide a constant force over one full counterclockwise thread revolution. Thus, the brake tube connector of the present invention eliminates operator dependency and vastly reduces brake repairs at assembly plants.

The above brief description sets forth rather broadly the more important features of the present disclosure so that the detailed description that follows may be better understood and so that the present contributions to the art may be better appreciated. There are, of course, additional features of the disclosure that will be described hereinafter which will form the subject matter of the claims appended hereto.

In this respect, before explaining the preferred embodiment of the disclosure in detail, it is to be understood that the disclosure is not limited in its application to the details of the following description or drawings. The brake tube connector of the present disclosure is capable of other embodiments and of being practiced and carried out in various ways. Also, it is to be understood that the phraseology and terminology employed herein are for description and not limitation. Where specific dimensional material specifications have been included or omitted from the specification of the claims, or both, it is to be understood that the same are not to be incorporated into the appended claims.

As such, those skilled in the art will appreciate the conception, upon which this disclosure is based, may readily be used as a basis for designing other structures, methods and systems for carrying out the purposes of the present invention. It is important therefore that the claims are regarded as including such equivalent instructions as far as they do not depart from the spirit and scope of the present invention.

Further, the purpose of the Abstract is to enable the U.S. Patent and Trademark Office and the public generally, especially the scientists, engineers and practitioners in the art who are not familiar with the patent or legal phraseology, to learn quickly from a cursory inspection the nature and essence of the technical disclosure of the application. Accordingly, the Abstract is intended to define neither the invention nor the application, which is only measured by the claims, nor is it intended to be limiting as to the scope of the invention in any way.

These and other features, advantages and objects of the present invention will be further understood and appreciated by those skilled in the art by reference to the following specification, claims and appended drawings.

BRIEF DESCRIPTION OF THE DRAWINGS

The disclosure of the high-pressure connector of the present invention is explained with illustrative embodiments shown in the accompanying drawings, where.

DETAILED DESCRIPTION OF PREFERRED EMBODIMENT

Figure 1:
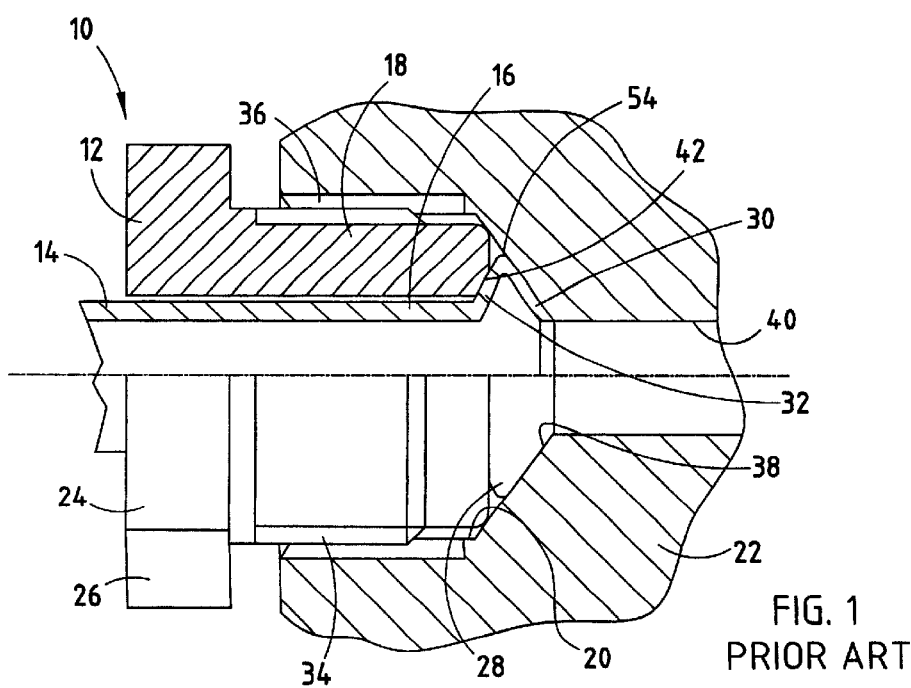
FIG. 1 is a cross-sectional view of a connector of the prior art for sealing an elongated tube to a body for flow of a fluid through said body.

The best mode for carrying out the invention is resented in terms of the preferred embodiment, wherein similar reference characters designate corresponding features throughout the figures of the drawings. Referring now to the drawings, particularly FIG. 1, there is shown a connector 10 of the prior art used to seal an elongated tube to a body for flow of a fluid through said body. The connector 10 includes an elongated nut 12 that is disposed about a length of brake line or tube 14 near a proximate end 16 of the tube 14. As is conventional, the nut 12 has a threaded proximate end 18 that is adapted to engage a threaded hole 20 in the brake component 22. A distal end 24 of the nut 12 is provided with flats 26, as is conventional, for driving the nut 12 into the hole 20 to a specified torque by an air-driven gun. As shown, connector 10 of the prior art includes a flare 28 at the proximate end 16 of the tube 14. The flare 28, as is known, is provided with an interior face 30 and an exterior face 32.

As exterior threads 34 of the nut 12 and interior threads 36 of the hole 20 are engaged to the proper torque, the inclined interior face 30 of the flare 28 is urged against an inclined shoulder 38, formed by a countersunk hole 40 within the hole 20 in the brake component 22, by an abutting face 42 disposed on the proximal end 18 of the nut 12 acting against the exterior face 32 of the flare 28. The hole 40 also further serves as a conduit for the brake fluid. Since the interface of the interior face 30 of the flare against the shoulder 38 is the sealing mechanism of the entire connector 10, it is important that the abutting face 42 of the nut 12 maintains a sufficient force upon the shoulder 38.

Figure 2:
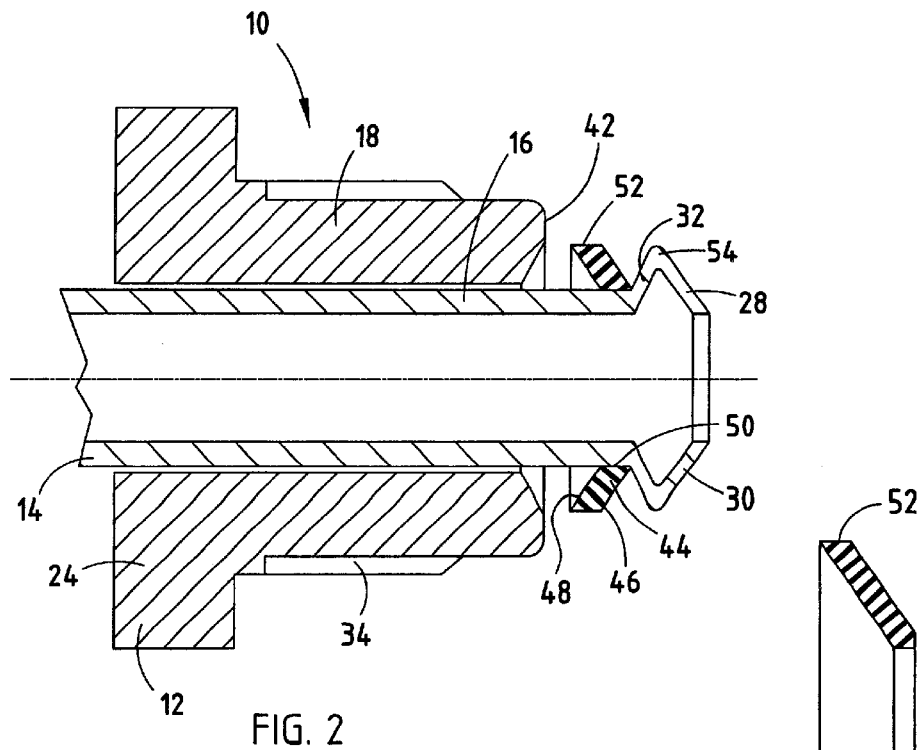
FIG. 2 is a cross-sectional view of a first embodiment of a connector of the present invention for sealing an elongated tube to a body for flow of a fluid through said body in its disassembled condition.

According to the present invention, sensitivity to counterclockwise rotation of the nut 12 is eliminated, as is the probability of losses in the clamping force between the inclined face 30 of the flare 28 and inclined shoulder 38 of the hole 20, through the structure shown in FIG. 2. Juxtaposed between the abutting face 42 of the nut 12 and the shoulder 38 of the hole 20 is a non-linear spring 44, preferably a conical or so-called "Belleville" spring. As used herein, the term "non-linear spring" includes those springs that manifest a non-linear load-deflection curve, such that when compressed within a predetermined displacement range, the spring 44 generates a roughly constant force. While the preferred embodiment utilizes conical springs, it is contemplated, as being within the scope of the present invention, to further incorporate other non-linear springs that obtain similar load-deflection characteristics.

Figure 6:
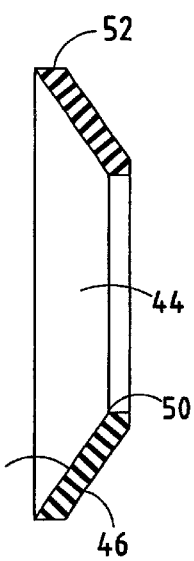
FIG. 6 is a cross-sectional view of the non-linear spring of the present invention.
Figure 3:
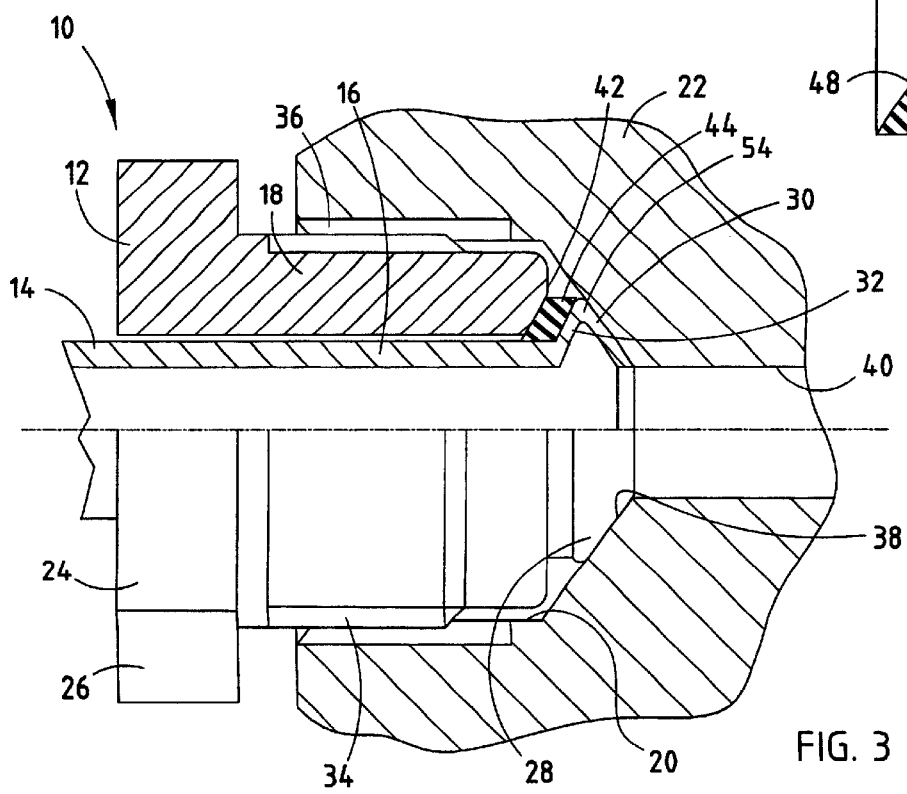
FIG. 3 is a cross-sectional view of the first embodiment of a connector of the present invention in its assembled condition.

In operation, after the connector 10 is initially assembled, that is, when the nut 12 is hand threaded into the hole 20, clearances are formed between the outer spring face 46 of the spring 44 and exterior face 32 of the flare 28 and the inner spring face 48 and the abutting face 42 of the nut 12. The spring 44 is preferably biased so that its inner diameter 50 faces the exterior face 32 of the flare 28 and its outer diameter 52 faces the abutting face of the nut 12, as shown in FIG. 2. As the nut 12 of connector 10 is threaded into the hole 20, the spring 44 snaps through to form a cone in the other direction and, when the connector 10 is completely tightened, the spring 44 is juxtaposed between the abutting face 42 of the nut 12 and the exterior face 32 of the flare 28, as shown in FIG. 3, so as to continuously urge the interior face 30 of the flare against the shoulder 38. Preferably, the non-linear spring 44 shown in FIGS. 2, 3 and 6 is constructed of spring steel, preferably SAE6150 or comparable steel.

It should be noted that the load generated by the spring 44 urging the interior face 30 into contact with the shoulder 38 can be selected to obtain a desired load until a predetermined amount of nut 12 movement, caused by counterclockwise rotation, is reached. For example, in accordance with available standard fastener specifications, a M10×1.5 thread having a property class of 4.6 and 4.8 can develop a 9.7 kN clamping force when tightened to a torque of 19.5 NM. Similarly, a standard M12×1.75 thread can develop a 7.15 kN clamping force with a torque of 17.6 NM applied. Since the final torque specification of a M10×1.0 brake component threaded connector is typically 17.5+/−2.7 NM, a M10×1.0 thread can be expected to develop a clamping force roughly the same as the M10×1.5 thread as the axial compressive force experienced between the interior face 30 of the tube 14 and the shoulder 38 of the hole 20. Thus, it is desired that the spring 44 generate an axial force of about 10 KN throughout a 1 mm deflection of the spring. Preferably, the spring 44 has an inner diameter of 5 mm, an outer diameter of 8 mm, a material thickness of about 1 mm and a free height of 1.55 mm to generate a compression load of 6.55 KN, in accordance with standard fastener specifications, which approaches the total clamping force of 10 KN obtained by the nut 12 and hole 20 interface alone. If the spring 44 is provided with an inner diameter of 14 mm, a material thickness of about 1.3 mm and a free height of 2.2 mm, a generated compression load would be 14.5 kN, based on data available from Fan Disc Corporation. Therefore, it is feasible to adjust the geometrical parameters of the spring 44 noted above in order to obtain the desired substantially constant clamping force of 10 KN within about 1 mm of the deflection range, along with an acceptable size that can be accommodated by the tube connector.

Thus, a conical spring 44 with a 1 mm compensating ability allows up to an entire counterclockwise rotation of the nut 12 without compromising performance of the typical M10×1.0 thread pitch connectors used in brake component connections. Moreover, by adjusting the thickness and free height of the spring 44, it is possible to readily select and design an appropriate conical spring 44 for various applications.

The spring 44 may be adapted to the particular application of the tube connector 10. For example, automotive brake tubing 14 is typically fabricated from fairly soft and compliant steel. To prevent damage during assembly, it is important that the spring 44 have a relatively blunt edge at the inner spring diameter 50 that is urged against the tube end 16. Such a curved shape would also improve stress distribution within the spring and improve reliability.

An important aspect of the present invention is that since the sensitivity between nut rotation and axial position is lessened, the need for a finer thread connector is eliminated. Accordingly, a standard pitch thread, such as M10×1.5, can be used. The present invention therefore reduces.the influence of operator error, not only as to the relationship between the torque of the nut 12 and the relative position of the interior face 30 and shoulder 38, but also as to the lowering of the possibility of cross-threading. Of course, if the amount of rearward motion creates a clearance between the interior face 30 and the shoulder 38 and exceeds the ability of the spring 44 to compensate, a gap will appear between the tube end 16 and the hole 20 and the performance of the connector 10 of the present invention will also become compromised.

To further reduce the possibility of cross-threading, it may be desirable in certain applications to specify thread tolerances that increase the clearance between the threads 34 of the nut 12 and the threads 36 of the hole 20. The thread friction is reduced and the operator can more easily hand start the nut 12. A commercial thread lock composition, such as Loctite®, may be applied to the last few (e.g., three) exposed threads 34 on the distal end 24 of the nut 12, which is subsequently secured by an air gun. With the first few threads of the proximal end 18 of the nut 12 untreated and the last few threads on the distal end 24 treated with the thread lock composition, easy hand start and thread lock are assured. Alternatively, special threads with asymmetrical profile angles, as is known in the art, can be used.

In some applications, it may be desirable to assure the final position and shape of the spring 44 to reduce stress concentration on the flare 28 at the proximal end 16 of the tube 14. For example, as shown in FIG. 2, when the connector 10 is loose, a gap may exist between the outer diameter 52 of the spring 44 and the outer diameter 54 of the flare 28. Likewise, the inner diameter 50 of the spring 44 may not be in contact with the abutting face 42 of the nut 12, particularly if the abutting face 42 is inclined inwardly as shown in order to follow the preferred inclined exterior face 32 of the flare 28.

Figure 5:
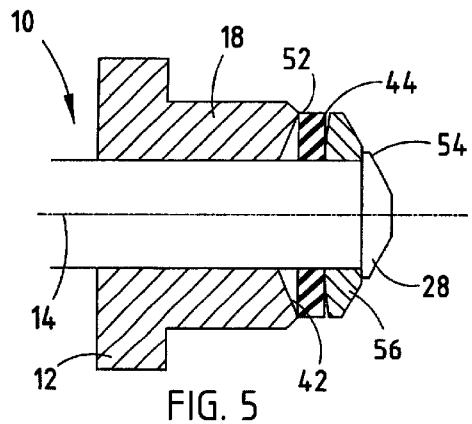
FIG. 5 is a cross-sectional view of the second embodiment of a connector of the present invention in its sealed condition, wherein the threaded mating hole is not shown.
Figure 4:
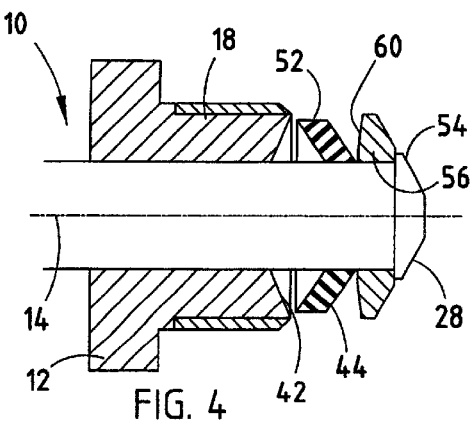
FIG. 4 is a cross-sectional view of a second embodiment of a connector of the present invention in its disassembled condition.
Figure 7:
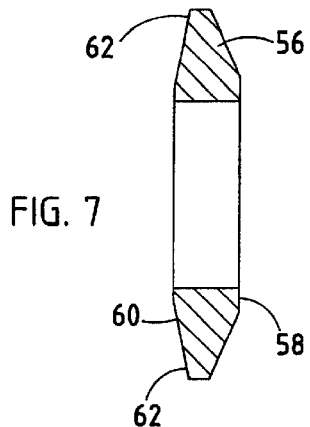
FIG. 7 is a cross-sectional view of the spacer of he second embodiment of the present invention.

As an alternative embodiment of the present invention, in order to properly locate and position the spring 44, a spacer 56 is provided, as shown in FIGS. 5, 6 and 7. The spacer 56 is located between the flare 28 and the spring 44 and has an interior face 58 that is preferably located adjacent exterior face 32 of the flare 28 and an exterior face 60 located adjacent the spring 44. While being tightened, the nut 12 advances along the thread 36 of the hole 20 and pushes the outer diameter 52 of the spring 44 toward the spacer 56, eliminating the gap therebetween. Eventually, the spring 44 moves through its flat planar condition and rests on the spacer 56, as shown in FIG. 5. If counterclockwise rotation of the nut 12 occurs, the nut 12 will retreat along the thread 36 of the hole 20 and move away from the flare 28 of the tube 14. Although the spring 44 will relax to allow a small gap to arise between the outer diameter 52 of the spring 44 and the outer diameter 62 of the spacer 56, the clamping force will remain generally unchanged because the spring 44 will remain in contact with the abutting face of the nut 12 and will compress, through the spacer 56, the flare 28 against the shoulder 38. The presence of the spacer 56 thus assures the proper final position and shape of the spring 44 and, by more closely approximating the final shape of the spring 44 and exterior face 32 of the flare 28, tends to thereby reduce the stress concentration on the flare 28. Thus, the connector 10 remains sealed even if limited counterclockwise rotation occurs on the nut 12 after securing. Of course, the spacer 56 can be alternatively positioned between a modified flare 28 and the spring 44 to generate the substantially constant restorative force.

In sum, the connector 10 of the present invention accommodates counterclockwise rotation of the nut without seal compromising connector sealing and reduces operator dependency without increasing the probability of cross-threading. The non-linear spring generates a substantially constant force over a deflection range to maintain the same clamping force regardless of whether or not the connector 10 is completely secured, within reasonable limitations. The brake tube connector 10 of the present invention therefore eliminates operator dependency and reduces brake repairs at assembly plants.

The drawbacks of the prior art have thus been overcome in an economical, practical and facile matter. While the preferred embodiment and example configuration has been shown and described, it is understood that various modifications and additional configurations would be apparent to those skilled in the art. It is intended that the specific embodiments and configurations disclosed are illustrative of the preferred and best modes for practicing the invention and should not be interpreted as limitations on the scope of the invention, as defined by the appended claims, and is to be appreciated that various changes, rearrangements and modifications may be made therein without departing from the scope of the invention as defined by the appended claims as interpreted according to the principles of patent law, including the doctrine of equivalents.

I claim:

1. A connector for an elongated tube, said elongated tube being adapted for sealing engagement with a body for flow of a fluid through said body, said tube having a flared end with an opening at said flared end, said flared end forming an interior face and an exterior face, said body having a recessed interior threaded hole axially aligned with and in fluid communication with said opening in said flared end of said tube, said threaded hole further being countersunk to define a shoulder against which said interior face of said flared end is disposed, said connector comprising:

a nut concentrically disposed about said tube proximate said flared end, said nut having a threaded exterior portion and an abutting face proximate to and concentric with said exterior face of said flared end, and a non-linear spring disposed between said exterior face of said flared end and said abutting face of said nut, said non-linear spring being displaced upon tightening of the nut to the body and generating a substantially constant restorative force over a portion of said displacement to urge said interior face of said flared end against said shoulder of said body.

2. The connector of claim 1, further comprising a spacer concentrically disposed about said tube adjacent to said exterior face of flared end, said spacer juxtaposed between said non-linear spring and said abutting face of said nut, wherein said non-linear spring is displaced toward and against said spacer upon tightening of the nut to the body and generating a substantially constant restorative force over said portion of said displacement of said non-linear spring for maintaining a sealed interface between said interior face of said flared end of said tube and said body.

3. The connector of claim 1, further comprising a spacer concentrically disposed about said tube adjacent to said exterior face of flared end, said spacer juxtaposed between said exterior face of said flared end and said non-linear spring, wherein said non-linear spring is displaced toward and against said spacer upon tightening of the nut to the body and generating a substantially constant restorative force over said portion of said displacement of said non-linear spring for maintaining a sealed interface between said interior face of said flared end of said tube and said body.

4. The connector of claim 1, wherein said spring is a Belleville spring.

5. The connector of claim 4, wherein said spring generates a substantially constant axial load through a deflection of at least one millimeter after the connector is assembled.

6. The connector of claim 1, wherein said shoulder is inwardly inclined and said interior face of said flare is outwardly inclined.

7. The connector of claim 1, wherein said abutting face is inwardly inclined and said exterior face of said flared end is outwardly inclined.

8. A high pressure fluid connector comprising:

an elongated hollow tube having a flared end with an opening at said flared end, said flared end having a first face and a second face;

a body having an interior threaded hole axially aligned with and in fluid communication with said opening in said tube and an interior passageway, said threaded hole further having a countersunk recess for receiving said flared end of said tube and defining a shoulder against which said first face of said flared end is urged;

a connecting nut disposed about said tube, said nut having a threaded exterior portion for engaging said threaded hole and an abutting face proximate to and concentric with said second face of said flared end; and a non-linear spring disposed between said second face of said flared end and said abutting face of said nut, said non-linear spring being displaced upon tightening of the nut to the body and generating a substantially constant restorative force over a portion of said displacement for maintaining a sealed interface between said first face of said flared end of said tube and said body.

9. A method for sealing an elongated tube to a body for flow of a fluid through said body, said tube having a flared end with an opening at said flared end, said flared end forming an interior face and an exterior face, said body having a recessed interior threaded hole axially aligned with and in fluid communication with said opening in said flared end of said tube, said threaded hole further being countersunk to define a shoulder against which said interior face of said flared end is disposed, said method comprising the steps of:

locating a nut concentrically about said tube proximate said flared end, said nut having a threaded exterior portion and an abutting face proximate to and concentric with said exterior face of said flared end;

locating a non-linear spring between said exterior face of said flared end and said abutting face of said nut; and tightening said nut and displacing said non-linear spring to generate a substantially constant restorative force over a portion of said displacement to urge said interior face of said flared end against said shoulder of said body to maintain a sealed interface between said elongated tube and said body.

10. The method of claim 9, further comprising the step of disposing a spacer concentrically about said tube adjacent to said exterior face of said flared end, wherein said spacer is juxtaposed between said non-linear spring and said exterior face of said flared end and said non-linear spring is displaced toward and against said spacer upon tightening of the nut to the body to generate a substantially constant restorative force over said portion of said displacement of said non-linear spring for maintaining a sealed interface between said interior face of said flared end of said tube and said body.

11. A connector comprising an elongated tube, said elongated tube being adapted for sealing engagement with a body for flow of a fluid through said body, said tube having a flared end with an opening at said flared end, said flared end forming an interior face and an exterior face, said body having a recessed interior threaded hole axially aligned with and in fluid communication with said opening in said flared end of said tube, said threaded hole further being countersunk to define a shoulder against which said interior face of said flared end is disposed, said connector comprising:

a nut concentrically disposed about said tube proximate said flared end, said nut having a threaded exterior portion and an abutting face proximate to and concentric with said exterior face of said flared end;

a non-linear spring disposed between said exterior face of said flared end and said abutting face of said nut, said non-linear spring being displaced upon tightening of the nut to the body and generating a substantially constant restorative force over a portion of said displacement to urge said interior face of said flared end against said shoulder of said body; and a spacer concentrically disposed about said tube adjacent to said exterior face of flared end, said spacer juxtaposed between said non-linear spring and said abutting face of said nut, wherein said non-linear spring is displaced toward and against said spacer upon tightening of the nut to the body and generating a substantially constant restorative force over said portion of said displacement of said non-linear spring for maintaining a sealed interface between said interior face of said flared end of said tube and said body.

12. A connector for an elongated tube, said elongated tube being adapted for sealing engagement with a body for flow of a fluid through said body, said tube having a flared end with an opening at said flared end, said flared end forming an interior face and an exterior face, said body having a recessed interior threaded hole axially aligned with and in fluid communication with said opening in said flared end of said tube, said threaded hole further being countersunk to define a shoulder against which said interior face of said flared end is disposed, said connector comprising:

a nut concentrically disposed about said tube proximate said flared end, said nut having a threaded exterior portion and an abutting face proximate to and concentric with said exterior face of said flared end, and a non-linear spring disposed between said exterior face of said flared end and said abutting face of said nut, said non-linear spring being displaced upon tightening of the nut to the body and generating a substantially constant restorative force over a portion of said displacement to urge said interior face of said flared end against said shoulder of said body; and a spacer concentrically disposed about said tube adjacent to said exterior face of flared end, said spacer juxtaposed between said exterior face of said flared end and said non-linear spring, wherein said non-linear spring is displaced toward and against said spacer upon tightening of the nut to the body and generating a substantially constant restorative force over said portion of said displacement of said non-linear spring for maintaining a sealed interface between said interior face of said flared end of said tube and said body.

13. The connector of claim 11, wherein said spring is a Belleville spring.

14. The connector of claim 13, wherein said spring generates a substantially constant axial load through a deflection of at least one millimeter after the connector is assembled.

15. A method for sealing an elongated tube to a body for flow of a fluid through said body, said tube having a flared end with an opening at said flared end, said flared end forming an interior face and an exterior face, said body having a recessed interior threaded hole axially aligned with and in fluid communication with said opening in said flared end of said tube, said threaded hole further being countersunk to define a shoulder against which said interior face of said flared end is disposed, said method comprising the steps of:

locating a nut concentrically about said tube proximate said flared end, said nut having a threaded exterior portion and an abutting face proximate to and concentric with said exterior face of said flared end;

locating a non-linear spring between said exterior face of said flared end and said abutting face of said nut;

disposing a spacer concentrically about said tube adjacent to said exterior face of said flared end, wherein said spacer is juxtaposed between said non-linear spring and said exterior face of said flared end; and tightening said nut and displacing said non-linear spring to the body toward and against said spacer upon tightening of the nut to generate a substantially constant restorative force over a portion of said displacement to urge said interior face of said flared end against said shoulder of said body to maintain a sealed interface between said interior face of said flared end of said elongated tube and said body.

* * * * *